US012176612B2

(12) United States Patent
Godard et al.

(10) Patent No.: US 12,176,612 B2
(45) Date of Patent: Dec. 24, 2024

(54) ULTRA-WIDEBAND CAVITY BACKED SLOT ANTENNA

(71) Applicant: Maverick RF Solutions, Inc., Huntsville, AL (US)

(72) Inventors: Jeff Godard, Arvada, CO (US); Joel Godard, Arvada, CO (US)

(73) Assignee: MAVERICK RF SOLUTIONS, INC., Louisville, CO (US)

( * ) Notice: Subject to any disclaimer, the term of this patent is extended or adjusted under 35 U.S.C. 154(b) by 163 days.

(21) Appl. No.: 18/101,158

(22) Filed: Jan. 25, 2023

(65) Prior Publication Data

US 2023/0246342 A1 Aug. 3, 2023

Related U.S. Application Data

(60) Provisional application No. 63/304,818, filed on Jan. 31, 2022.

(51) Int. Cl.
*H01Q 13/18* (2006.01)
*H01Q 13/10* (2006.01)

(52) U.S. Cl.
CPC ........... *H01Q 13/18* (2013.01); *H01Q 13/106* (2013.01)

(58) Field of Classification Search
CPC ............................ H01Q 13/18; H01Q 13/106
See application file for complete search history.

(56) References Cited

U.S. PATENT DOCUMENTS

| | | | | |
|---|---|---|---|---|
| 6,545,644 | B1 * | 4/2003 | Sinclair | H01Q 13/12 343/770 |
| 10,826,187 | B1 * | 11/2020 | Godard | H01Q 5/50 |
| 2016/0294067 | A1 * | 10/2016 | Chang | H01Q 5/364 |
| 2023/0208042 | A1 * | 3/2023 | Lin | H01Q 9/045 343/702 |

* cited by examiner

*Primary Examiner* — Graham P Smith
*Assistant Examiner* — Amal Patel
(74) *Attorney, Agent, or Firm* — Howard M. Gitten, Esq.; Lewis Brisbois Bisgaard and Smith LLP

(57) ABSTRACT

An ultra-wideband cavity backed slot antenna includes an electrically conductive ground plane having an elongated slot aperture behind which a cavity is formed by electrically conductive surfaces. Within the cavity, a feed structure spanning a substantial portion of the length of the slot is formed from an electrical conductor. The feed can be attached to a coaxial, microstrip, strip-line or other type of transmission line or waveguide. Tuning elements distributed along the feed structure connect the feed to the surface of the cavity.

5 Claims, 11 Drawing Sheets

ULTRA-WIDEBAND CAVITY BACKED SLOT ANTENNA

CROSS REFERENCE TO RELATED APPLICATIONS

This application claims priority to U.S. Provisional Application No. 63/304,818, filed on Jan. 31, 2022 and titled "ULTRA-WIDEBAND CAVITY BACKED SLOT ANTENNA" the contents of which are incorporated herein its entirety.

BACKGROUND OF THE INVENTION

The present invention generally relates to antennas and, more particularly, the improvement of the bandwidth over which cavity backed slot antennas can operate in the fundamental harmonic mode.

There are many applications requiring antennas to be conformal to surfaces, occupy small volumes, and be robust to many types of environments including very high temperatures. In the field of antenna design, the slot antenna, and in particular, the cavity backed slot antenna is known to be an excellent candidate to satisfy this set of requirements. However, despite these clear advantages, the prior art suffers from the disadvantage that the cavity backed slot antenna operates over a relatively narrow 10% bandwidth. As such, this prior art technology does not support the increasing demand for today's ultrawide bandwidth communication and wireless systems. Prior art techniques employed to improve the operational bandwidth of cavity backed slot antennas achieve bandwidth ratio of up to 3:1. This performance still falls short of the demands of modern ultra-wide bandwidth (UWBW) systems often requiring bandwidth ratios in great excess of 3:1.

Accordingly, a slot antenna overcoming the shortcomings of the prior art is desired.

SUMMARY OF THE INVENTION

A slot antenna has an electrically conductive sheet. An elongated slot perforates the elongated sheet. A cavity extends from the electrically conductive sheet at the slot and is formed by one or more electrically conductive surfaces. An electrically conductive feed is formed within the cavity. The feed is substantially T-shaped with a feed bar extending substantially along the length of the slot and a stem extending from a central position along the feed bar to be substantially orthogonal to the feed bar in facing relationship with the slot. A tapered feed transition extends from the stem to the feed bar wherein the taper may take the form of either a linear profile, nonlinear profile, or a combination thereof. A tuning element is distributed along at least a portion of the length of the feed bar, wherein each tuning element connects said feed bar to a cavity surface by at least one of electrically conductive, resistive, capacitive, or inductive means.

BRIEF DESCRIPTION OF THE DRAWINGS

The present disclosure will be better understood by reading the written description with reference to the accompanying drawing in which like reference numerals denote similar structure and refer to like elements throughout in which.

DETAILED DESCRIPTION OF THE PREFERRED EMBODIMENTS

Hereinafter, embodiments of the present invention will be described with reference to the accompanying drawings.

Said descriptions and drawings provide exemplary constructions, being illustrative rather than comprehensive.

Figure 1:
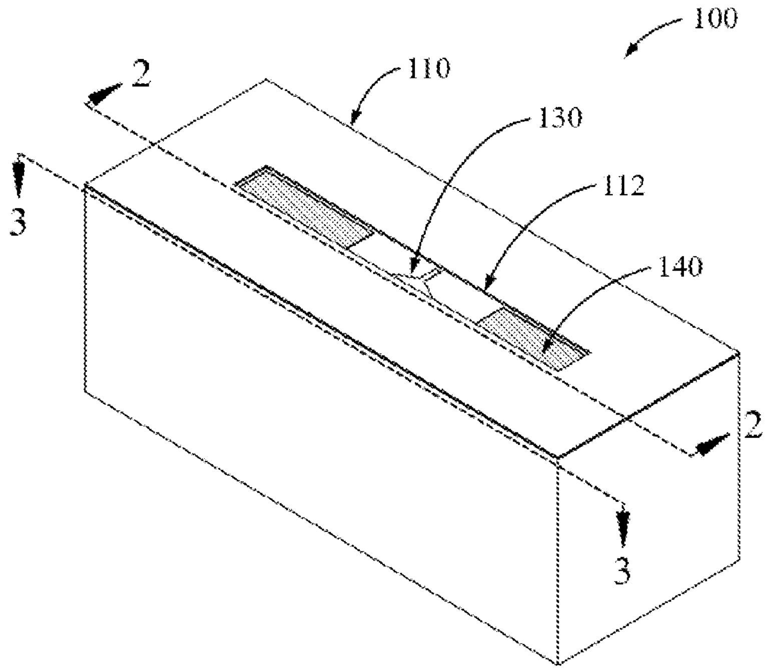
FIG. 1 is a perspective view of a wideband cavity backed slot antenna according to a first embodiment of the present invention.

FIG. 1 shows a perspective view of a cavity backed slot antenna 100. An electrically conductive surface forms a ground plane 110. An elongated slot 112 perforates the ground plane 110 forming the slot antenna 100 aperture.

Figure 2:
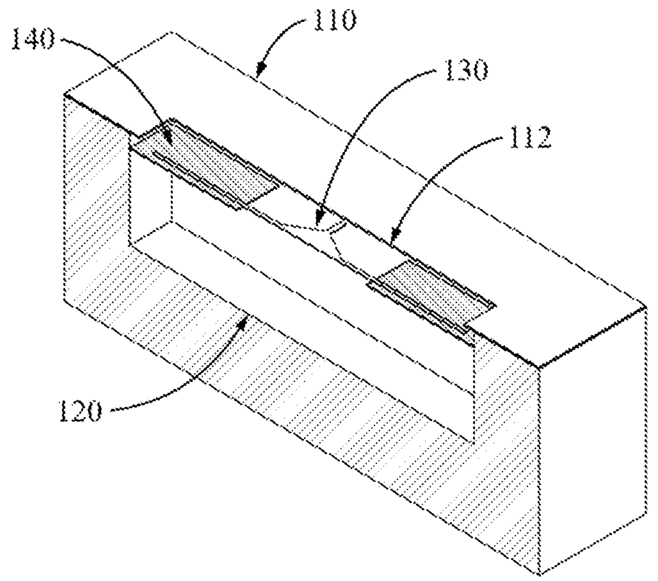
FIG. 2 is a sectional view of the antenna taken along line 2-2 of FIG. 1.
Figure 3:
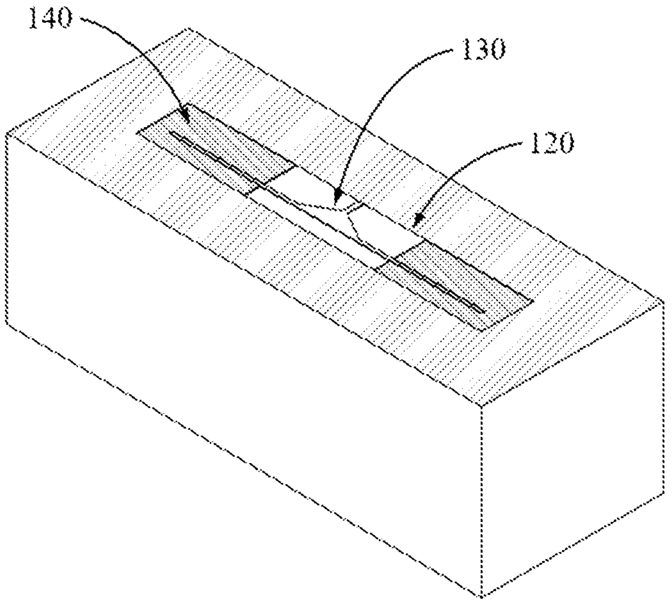
FIG. 3 is a sectional view of the antenna taken along line 3-3 of FIG. 1.
Figure 4:
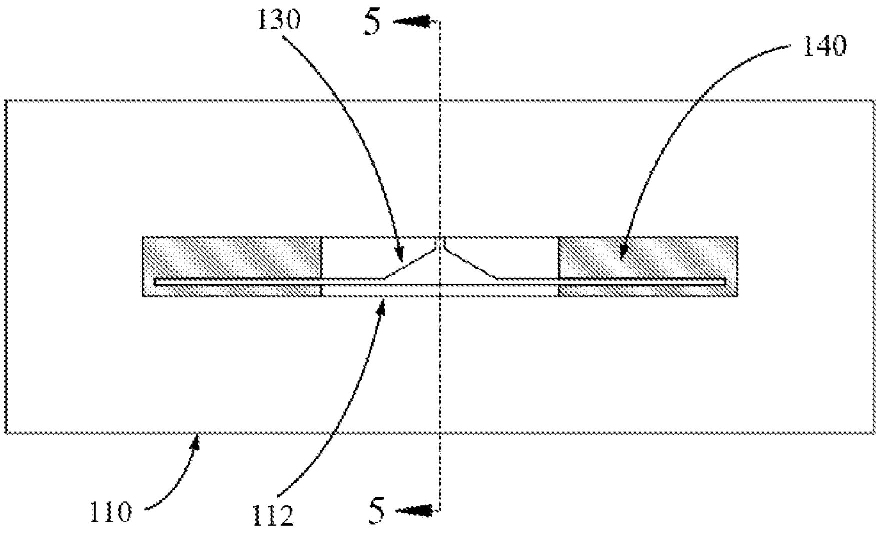
FIG. 4 is a top-plan view of the antenna of FIG. 1.

As shown in FIG. 2 and FIG. 3, providing sectional views of the cavity backed slot antenna 100, an electrically conductive cavity 120 is formed to extend behind the ground plane 110 and away from and in communication with the slot 112. In the embodiment depicted by FIG. 2 and FIG. 3, the cavity 120 faces and the perimeter of the slot 112 are not shown to be coincidental. This is not a requirement of the present invention, but rather a single embodiment. In other embodiments, the cavity 120 faces can be coincident with the perimeter of the slot 112.

Figure 5:
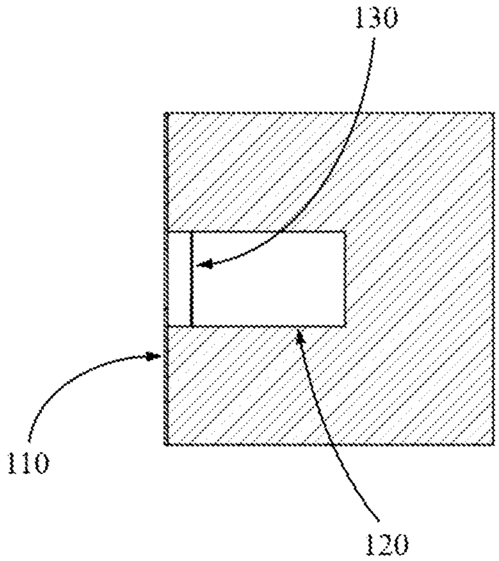
FIG. 5 is a sectional view of the antenna of FIG. 1 taken along line 5-5 of FIG. 4.
Figure 6:
FIG. 6 is a front plan view of the antenna of FIG. 1.
Figure 7:
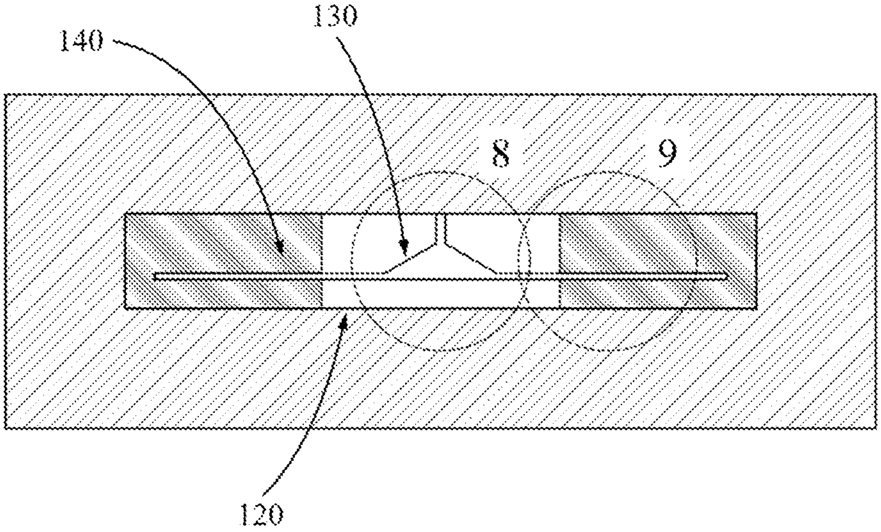
FIG. 7 is a sectional view of the antenna of FIG. 1 taken along line 7-7 of FIG. 6.
Figure 8:
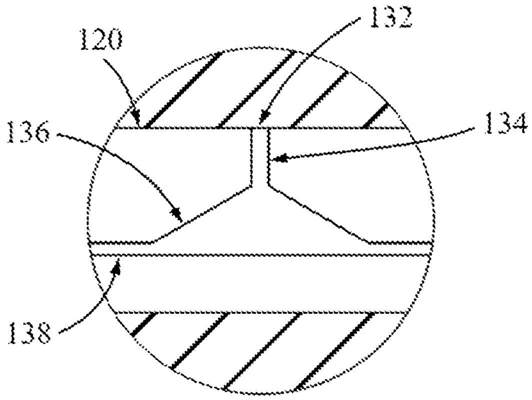
FIG. 8 is a detailed view of the feed region of FIG. 7 illustrating the feed point, feed stem, tapered transition, and central portion of the feed bar as shown in the circle 8 of FIG. 7.

Within cavity 120, a substantially planar, substantially T-shaped, electrically conductive feed structure 130 is formed. A plane of feed structure 130 is substantially parallel to the ground plane 110 as can be seen in FIG. 5. Furthermore, the feed structure 130 can be positioned any distance from the slot 112 within the cavity 120 in facing relationship with slot 112. The structure of the feed structure 130 is further detailed in FIG. 7 and FIG. 8.

More specifically, the feed structure 130 includes a feed point 132, a stem 134, a feed bar 138, and a tapered transition 136 from the stem 134 to the feed bar 138. The feed point 132, being coincident with one of the cavity 120 faces, is representative of the point at which the feed structure 130 transitions to a connector, waveguide, or some other structure by which electromagnetic energy can be delivered to or accepted from the antenna 100. From the feed point 132, the stem 134 of the feed structure 130 extends into the cavity 120 in a direction that is substantially perpendicular (orthogonal) to the long dimension of the slot 112.

The length and width of the stem 134 can be adjusted to affect primarily, but without limitation to, the impedance match of the slot antenna 100. The feed stem 134 connects to the feed bar 138 through a tapered feed transition 136. In the present embodiment, the tapered feed transition 136 is formed by a gradual expanding taper in the width of the feed stem 134 until it joins the feed bar 138; however, the size and profile of this tapered feed transition 136 can be adjusted to further affect the performance of the slot antenna 100 including, but not limited to, the match, gain, and radiation pattern.

In some embodiments tapered feed transition 136 may be a “reverse taper”; broadening in a direction towards feed point 132 away from feed bar 130. In other embodiments, this tapered feed transition 136 can be omitted so that the feed stem 134 connects directly to the feed bar 138 without any tapered feed transition 136, while in others, as depicted in the alternative embodiment of antenna 200, described below, it may occupy the entire length of stem 134 and or the feed bar 138. Furthermore, in other embodiments, this tapered feed transition 136 may follow a nonlinear profile being formed by a profile with at least one bend and or curve. The stem 134 operatively connects the tapered feed transition 136 to a central position along the length of the feed bar 138. The feed bar 138 extends substantially the length of the slot 112 in a direction that is substantially parallel to the long dimension of the slot 112. The length and width of the feed bar 138 can be adjusted to affect the performance of the slot antenna 100 including, but not limited to, the match, gain, and radiation pattern.

A tuning element 140 is distributed along at least a portion of the length of the feed bar 138 and, in some embodiments, at the ends of the feed bar 138. As will be shown below, a single continuous tuning element 140 or plurality of separate tuning elements 140*a*-140*d* connect the feed bar 138 to the faces of the cavity 120. Each tuning element 140 connects the feed bar 138 to a face of the cavity 120 by at least one of electrically conductive, resistive, capacitive, or inductive means. As seen below, the electrical conductance, resistance, capacitance, and or inductance can be achieved by at least one of distributed structure or lumped element component. The purpose of each tuning element 140 is to change the effective electrical length of the feed bar 138 so that only the fundamental $1^{st}$ harmonic of the slot antenna 100 is excited by the feed structure 130 across an extremely wide frequency bandwidth. The number, dimension, and complex impedance of each tuning element 140 can be adjusted to affect the performance of the slot antenna 100. For exemplary purposes, FIG. 9*a*, FIG. 9*b*, FIG. 9*c*, and FIG. 9*d* present multiple embodiments of tuning elements 140.

Figure 9A:
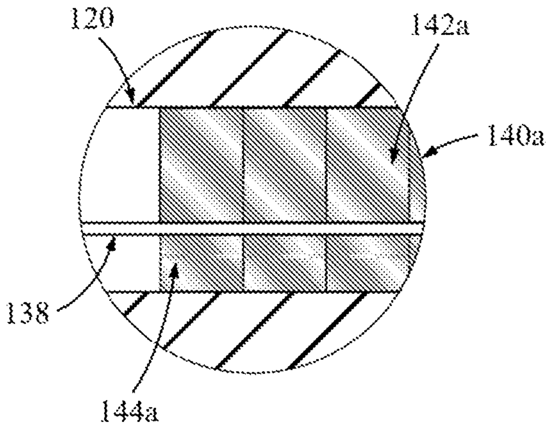
FIG. 9*a* is a detailed view showing a first exemplary embodiment of the tuning elements as shown in the circle 9 of FIG. 7 of FIG. 7.

Reference is now made to FIGS. 9*a*-9*d* in which various embodiments of a tuning structure are provided. Like numerals are utilized to indicate like structure. As shown in FIG. 9*a*, a first embodiment of the tuning element 140 may take the form of a continuous sheet. This sheet may be formed from a feed-side tuning element 142*a* that electrically couples the feed bar 138 to an internal facing face of cavity 120 which is proximate the feed points 132, a second side tuning element 144*a* extending from an opposite-side face of cavity 120, which is proximate the feed points 132, a second side tuning element 144*a* extending from an opposite side to a face of the cavity 120 and electrically couples the feed bar 138 to a face of the cavity 120 distant from the feed point 132, or a combination of both. In some embodiments, the tuning elements 142*a* and 144*a* can be formed by a sheet of electrically resistive material or an electromagnetic metasurface to achieve the desired complex surface impedance. The impedance values achieved can be uniform, discretely varying, or continuously varying over the surface of the tuning element 140.

Figure 9B:
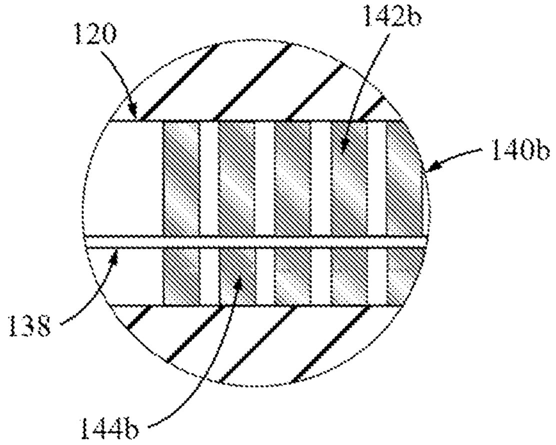
FIG. 9*b* is a detailed view showing a second exemplary embodiment of the tuning elements as shown in the circle 9 of FIG. 7 of FIG. 7.

FIG. 9*b* depicts a tuning element constructed in accordance with a second embodiment of the invention wherein the tuning element 140*b* is formed by a plurality of separate elements distributed along at least a portion of the feed bar 138. Tunning element 140*b* may be formed by a first plurality of feed-side tuning elements 142*b* that electrically connect the feed bar 138, at spaced intervals, to a face of the cavity 120 which is proximate the feed point 132. Tunning element 140*b* may also include a plurality of opposite-side tuning elements 144*b* that connect the feed bar 138 to a face of the cavity 120 distant from the feed point 132, or a combination of both. In a preferred non limiting embodiment, tuning elements 142*b* and 144*b* are disposed colinearly with each other. Each of the feed-side tuning elements 142*b* and opposite-side tuning elements 144*b* may be formed by lumped RF elements, distributed RF elements, an electromagnetic metasurface, or a combination thereof.

Figure 9C:
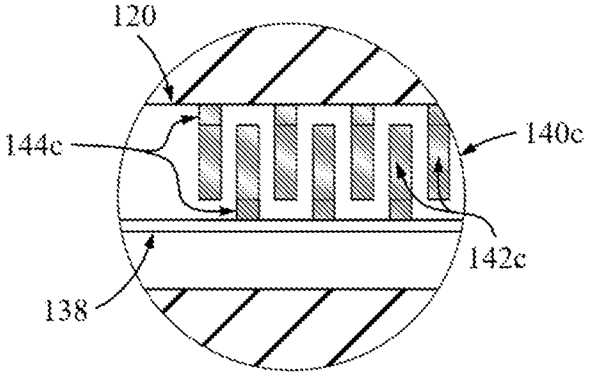
FIG. 9*c* is a detailed view showing a third exemplary embodiment of the tuning elements as shown in the circle 9 of FIG. 7 of FIG. 7.
Figure 9D:
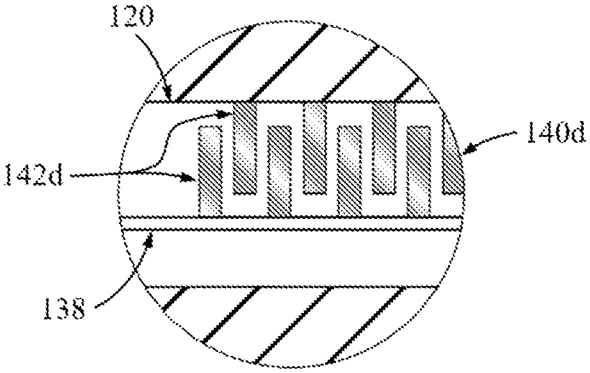
FIG. 9*d* is a detailed view showing a fourth exemplary embodiment of the tuning elements of FIG. 7.

Reference is now made to FIG. 9*d* in which yet another embodiment of the invention is presented in which a plurality of tuning elements 140*d* includes a plurality of electrically conductive feed-side tuning elements 142*d* disposed in alternating spaced relationship. A first set of tuning elements 142*d* extend from a face of the cavity 120, towards, but spaced from feed bar 138. A second subset, every other tuning element 142*d*, is disposed between adjacent tuning elements 142*d* of the first subset, and extends from feed bar 138 towards, but spaced from a face of cavity 120 from which the first subset extends. Tuning elements of the first subset 142*d* and second subset 142*d* connect the feed bar 138 to a face of the cavity 120 by primarily capacitive means for frequencies below the fundamental resonance of each of the tuning elements 142*d*. These tuning elements 142*d* operate in much the same way as a prior art interdigital capacitor. An example of yet another embodiment of the invention is shown in FIG. 9*c* which shows a similar structure as shown in FIG. 9*d* with one notable difference. In this embodiment, like numerals are used to indicate like structure, and the alternating capacitive tuning elements 142*c* are connected to the feed bar 138 and face of the cavity 120 respectively by series resistive tuning elements 144*c*. In this embodiment, the plurality of tuning elements 140*c* operate in much the same manner as a lossy interdigital capacitor.

As seen from the above a preferred embodiment is for the tuning element to extend from the feed bar 138 to the conductive inner wall of the cavity 120 on either side of the feed bar 138 as well as balanced on both sides of the taper 136. However, the invention contemplates tuning elements that are disposed on only one side of taper 136, extend towards a cavity wall from only one side of feed bar, or are electrically coupled, but not necessarily physically connected to the cavity wall.

Figure 10:
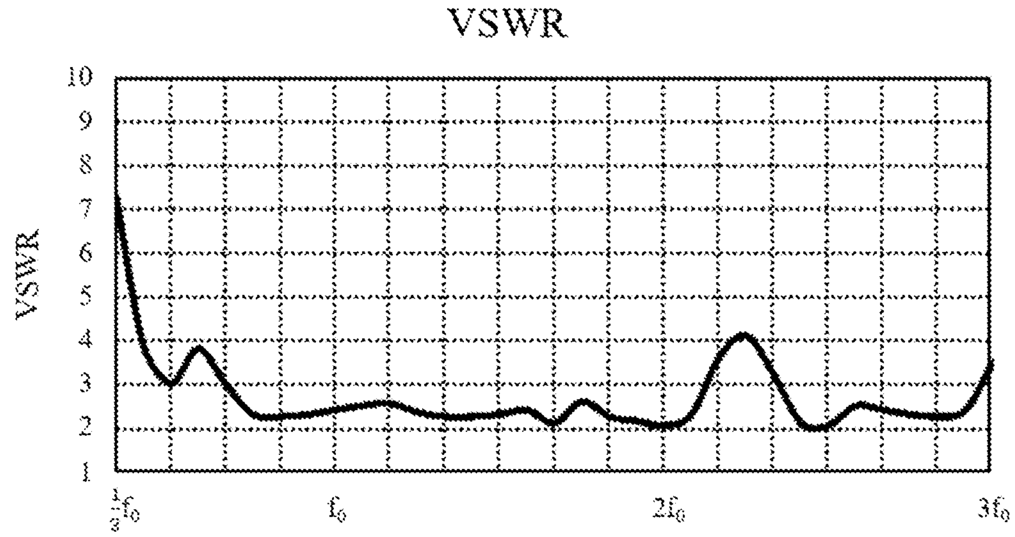
FIG. 10 is a graphical representation of a simulated wideband VSWR (voltage standing wave ratio) performance of the antenna of FIG. 1 having tuning elements of the same construction as those shown in FIG. 9*c*.
Figure 11:
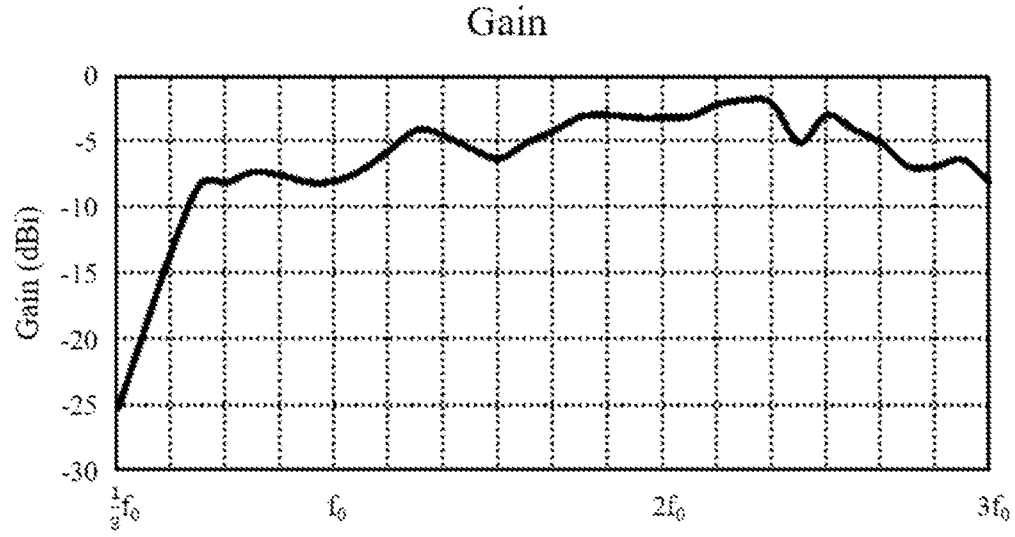
FIG. 11 is a graphical representation of a simulated wideband swept frequency gain performance of the antenna of FIG. 1 having tuning elements of the same construction as those shown in FIG. 9*c*.

The electrical performance for an example embodiment of the type shown in FIG. 9*c* is presented in FIG. 10 and FIG. 11. As shown in FIG. 10, a relatively low voltage standing wave ration ("VSWR") can be achieved across an extremely wide 9:1 bandwidth. Further adjustment of the dimensions of the capacitive tuning elements 142*c* and resistive tuning elements 144*c* can yield further improved VSWR performance. As can be seen in FIG. 11, this embodiment also operates over an extremely wide frequency range with appreciable gain. The dimensions of the antenna 100 can be scaled to adjust the center frequency $f_0$ depicted in FIGS. 10 and 11.

Figure 12:
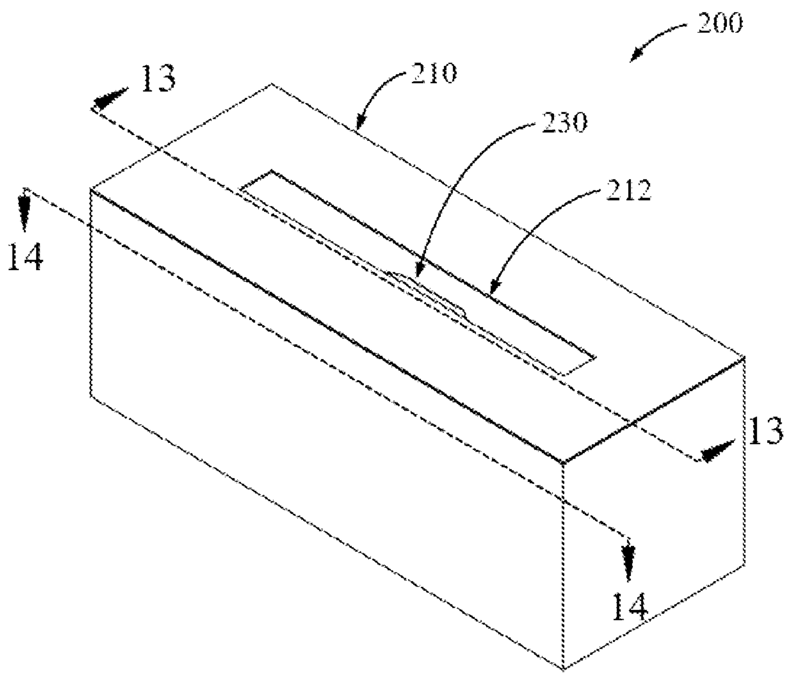
FIG. 12 is a perspective view of a wideband cavity backed slot antenna according to an alternative exemplary embodiment of the present invention.
Figure 13:
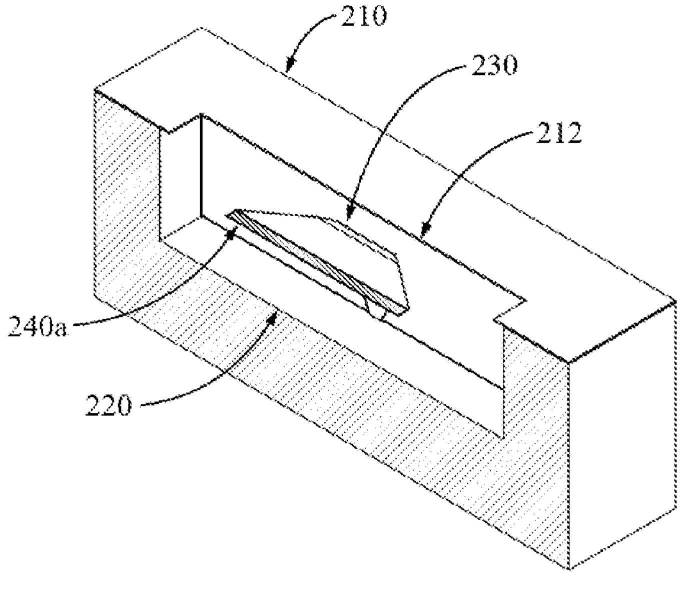
FIG. 13 is a sectional view of the alternative embodiment of FIG. 12 taken along line 13-13 of FIG. 12.
Figure 14:
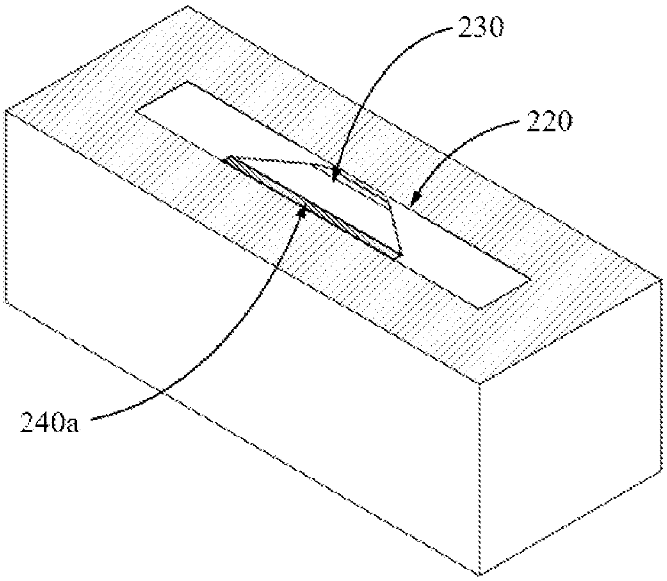
FIG. 14 is a sectional view of the alternative embodiment of FIG. 12 taken along line 14-14 of FIG. 12.
Figure 15:
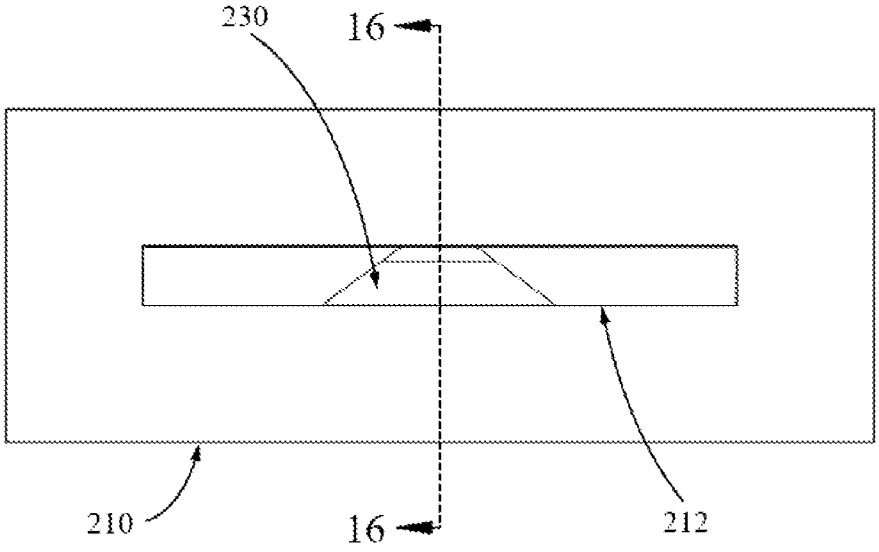
FIG. 15 is a top-plan view of the alternative embodiment of FIG. 12.
Figure 16:
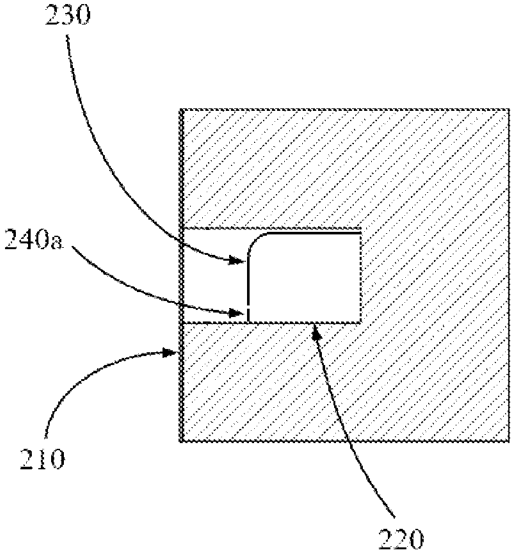
FIG. 16 is a sectional view of the alternative embodiment of FIG. 12 taken along line 16-16 of FIG. 15.
Figure 17:
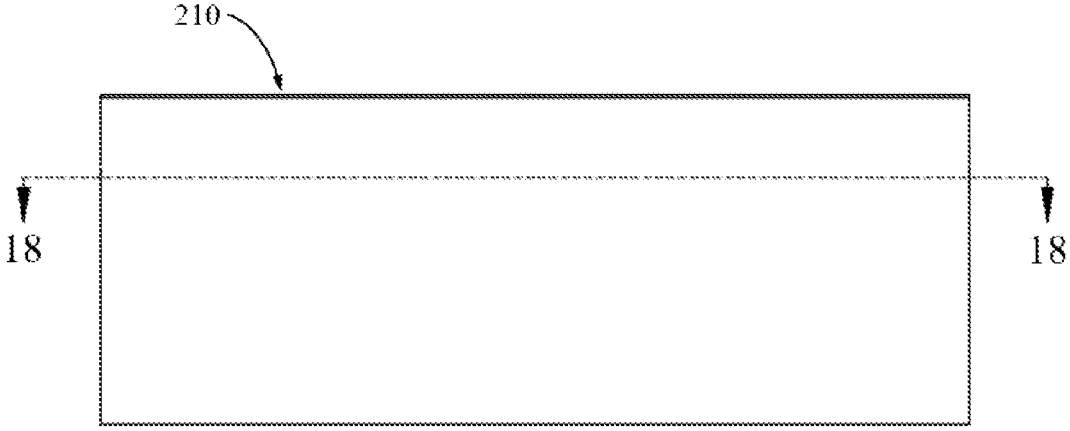
FIG. 17 is a front plan view of the alternative embodiment of FIG. 12.
Figure 18:
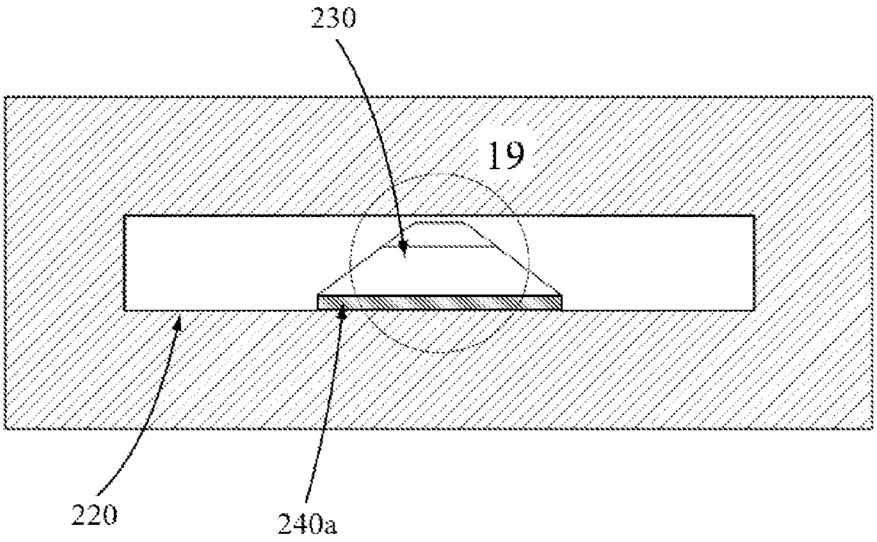
FIG. 18 is a sectional view of the alternative embodiment of FIG. 12 taken along line 18-18 of FIG. 17.
Figure 19:
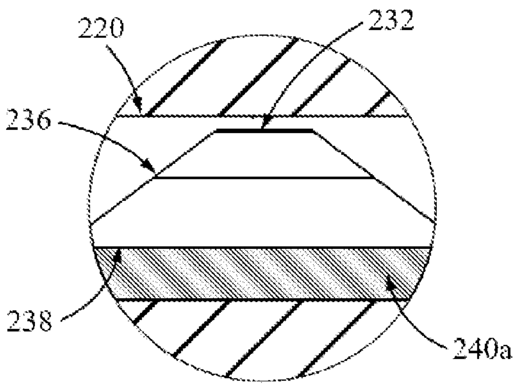
FIG. 19 is a detailed view of the feed region of FIG. 18 illustrating the feed point, tapered transition, central portion of the feed bar, and tuning element as shown in the circle 19 of FIG. 18.

Reference is now made to FIGS. 12-19 in which a slot antenna 200 constructed in accordance with a second embodiment of the present invention is depicted. In the embodiment of FIG. 12, slot antenna 200 includes an alternative tapered transition 236; tapered transition 236 extending substantially the length of slot antenna 200 from the feed point 232 coincides with the back face of the cavity 220. (See FIGS. 13, 14, 18) The tapered transition 236 forms the stem (subsumed into the tapered structure), and feed bar 138. The tapered transition 236 extends from feed point 232 through feed bar 238. (See FIGS. 15 and 18) As seen in FIGS. 14, 16 and 18, a single tuning element 240*e* is distributed along the entire length of the feed bar 238 and connects the feed bar 238 to a side face of the cavity 220 along this length.

Figure 20:
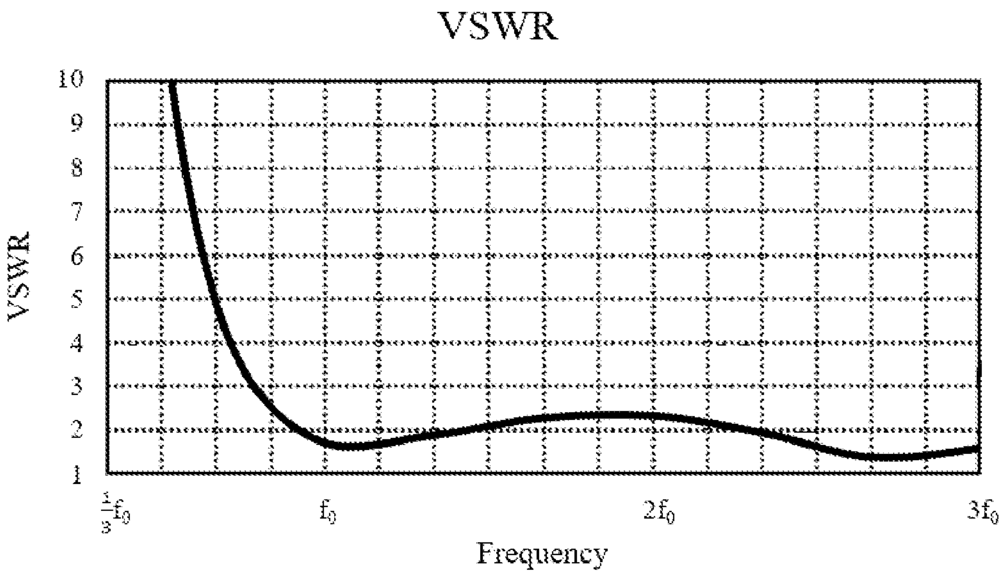
FIG. 20 is a graphical representation of a simulated wideband VSWR (voltage standing wave ratio) performance of the alternative embodiment of FIG. 12 having tuning elements of the same construction as those shown in FIG. 19.
Figure 21:
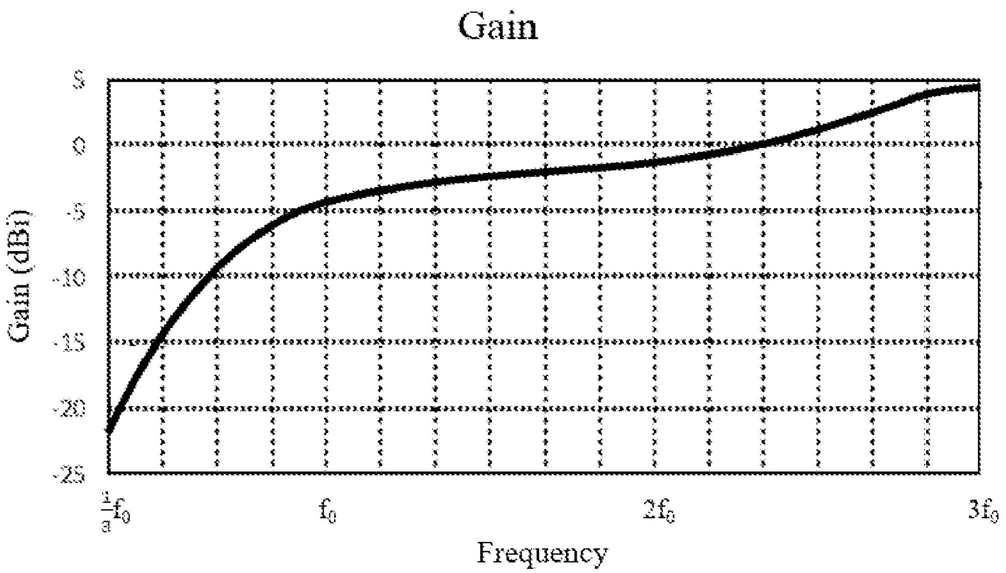
FIG. 21 is a graphical representation of a simulated wideband swept frequency gain performance of the wideband cavity backed slot antenna of FIG. 12 having tuning elements of the same construction as those shown in FIG. 19.

The electrical performance for the alternative exemplary embodiment of antenna 200 is presented in FIG. 20 and FIG. 21. As shown in FIG. 20, a relatively low VSWR can be achieved across an extremely wide 6:1 bandwidth. Further adjustment of the dimensions of the tuning element 240*e* and feed bar 238 can yield further improved VSWR performance. As can be seen in FIG. 21, this alternative exemplary embodiment also operates over an extremely wide frequency range with appreciable gain of a 9:1 bandwidth.

As seen from the above, in each embodiment, the present invention addresses the bandwidth limitations of the prior art cavity backed slot antenna through the use of a modified T-bar feed. Of interest is the wideband electrical performance of cavity backed slot antennas with particular attention to VSWR, gain, and radiation pattern shape. The distribution of resistive, inductive, and or capacitive ("RLC") tuning elements along the T-bar allows the effective electrical length of the T-bar to self-scale over frequency. This self-scaling enables the T-bar to support currents along a portion of its length commensurate with the wavelength of the excited frequency over very wide bandwidths.

At frequencies near the low end of the band of operation, the T-bar is loaded by these tuning elements making the T-bar appear to have a larger electrical than physical length. The result is that the slot antenna of the present invention can support frequencies of operation much lower than would be realizable using a prior art half-wavelength long slot antenna. At frequencies near the high end of the band of operation, the tuning elements suppress excitation of the higher order $TE_{30}$ mode which degrades the shape of the radiation pattern as well as VSWR and gain performance.

This self-scaling behavior is achieved by the judicious placement of the RLC network tuning elements along the T-bar. These tuning elements act as filters and chokes allowing the slot antenna of the present invention to operate over ultra-wide bandwidths (UWB) approaching bandwidth ratios of substantially 9:1.

In the present embodiment, thinning of the feed bar provides a series inductance acting as a choke to higher frequency currents further contributing to the self-scaling behavior of the modified T-bar feed.

While the present invention has been particularly shown and described with reference to exemplary embodiments thereof, it will be apparent to those of ordinary skill in the art that various changes in form and details may be made therein and that the disclosed invention may assume many embodiments other than those specifically described above without departing from the spirit and scope of the present invention as defined by the following claims.

The invention claimed is:

1. An antenna, comprising:

(a) an electrically conductive sheet;

(b) an elongated slot formed in said sheet;

(c) one or more electrically conductive surfaces forming a cavity, the cavity extending from the electrically conductive sheet, away from the slot;

(d) an electrically conductive feed structure disposed within said cavity, having a feed bar extending substantially parallel with a length of said slot, wherein the feed structure has a feed point end and a feed bar facing end, the feed point facing end being narrower than the feed bar facing end and a feed stem extending substantially orthogonally to said feed bar from a substantially central position along said feed bar towards a first surface of said cavity;

(e) a tapered feed transition from said feed point facing end towards the feed bar facing end, wherein the taper exhibits the form of one of a linear profile, nonlinear profile, or a combination thereof;

(f) a tuning element distributed along at least a portion of the length of said feed bar wherein said tuning element electrically couples said feed bar to one of the first surface of said cavity and a second surface of the cavity by at least one of electrically conductive, resistive, capacitive, or inductive means.

2. The antenna of claim 1, wherein the tuning element is a single continuous element electrically coupling the feed bar to the cavity surface.

3. The antenna of claim 1, wherein the tuning element is a formed as a plurality of tuning structures.

4. The antenna of claim 1, wherein the tuning element includes a first plurality of feed side tuning elements disposed at spaced intervals and extending from said feed bar and towards, but spaced from a surface of said cavity, and a second plurality of feed side tuning elements extending from the surface of said surface of said cavity and towards, but spaced form said feed bar, a respective feed side tuning element of the plurality of feed side element being disposed between a respective pair of feed side tuning elements of said first plurality of feed side tuning elements.

5. The antenna of claim 1, wherein the feed structure is T-shaped.

* * * * *